United States Patent
Murata et al.

[11] Patent Number: 5,159,458
[45] Date of Patent: Oct. 27, 1992

[54] CAMERA SENSING WHEN A MEMORY CARTRIDGE IS INSTALLED

[75] Inventors: Yoshitaka Murata; Hideaki Kawamura, both of Kawasaki; Kan Takaiwa, Hachioji; Kenichi Nagasawa, Kawasaki; Junzo Taira, Tokyo, all of Japan

[73] Assignee: Canon Kabushiki Kaisha, Tokyo, Japan

[21] Appl. No.: 846,773

[22] Filed: Mar. 9, 1992

Related U.S. Application Data

[63] Continuation of Ser. No. 404,520, Sep. 8, 1989, abandoned.

[30] Foreign Application Priority Data

Sep. 13, 1988 [JP] Japan .............................. 63-227461
Sep. 13, 1988 [JP] Japan .............................. 63-227462

[51] Int. Cl.⁵ ...................... H04N 5/30; H04N 5/225
[52] U.S. Cl. ..................................... 358/229; 358/909
[58] Field of Search .............. 358/209, 906, 909, 229, 358/335; 360/96.5, 96.6; 361/212, 220, 399; 439/326, 296

[56] References Cited

U.S. PATENT DOCUMENTS

| | | | |
|---|---|---|---|
| 4,489,351 | 12/1984 | d'Alayer de Costemore d'Arc | 358/209 |
| 4,810,203 | 3/1989 | Komatsu | 439/326 |
| 4,812,931 | 3/1989 | Shibalke | 360/96.6 |
| 4,820,186 | 4/1989 | Fujii | 439/326 |
| 4,835,635 | 5/1989 | Sasaki et al. | 360/96.5 |
| 4,837,628 | 6/1989 | Sasaki | 358/909 |
| 4,887,161 | 12/1989 | Watanabe et al. | 358/906 |
| 4,907,231 | 3/1990 | Watanabe et al. | 358/909 |

FOREIGN PATENT DOCUMENTS 247883 9/1981 France .............................. 439/296

Primary Examiner—James J. Groody
Assistant Examiner—Safet Metjahic
Attorney, Agent, or Firm—Fitzpatrick, Cella Harper & Scinto

[57] ABSTRACT

Camera apparatus including a loading detection sensor for detecting the completion of the loading of a solid-state memory cartridge, a contact member for contacting electric contacts on the cartridge for communicating data between the camera and the cartridge, and a communication control circuit for starting data communication between the memory cartridge and the camera when the loading detection sensor detects that the cartridge has been installed. The contact member moves from a first position at a distance from the memory cartridge contacts to a second position contacting the memory cartridge contacts.

11 Claims, 12 Drawing Sheets

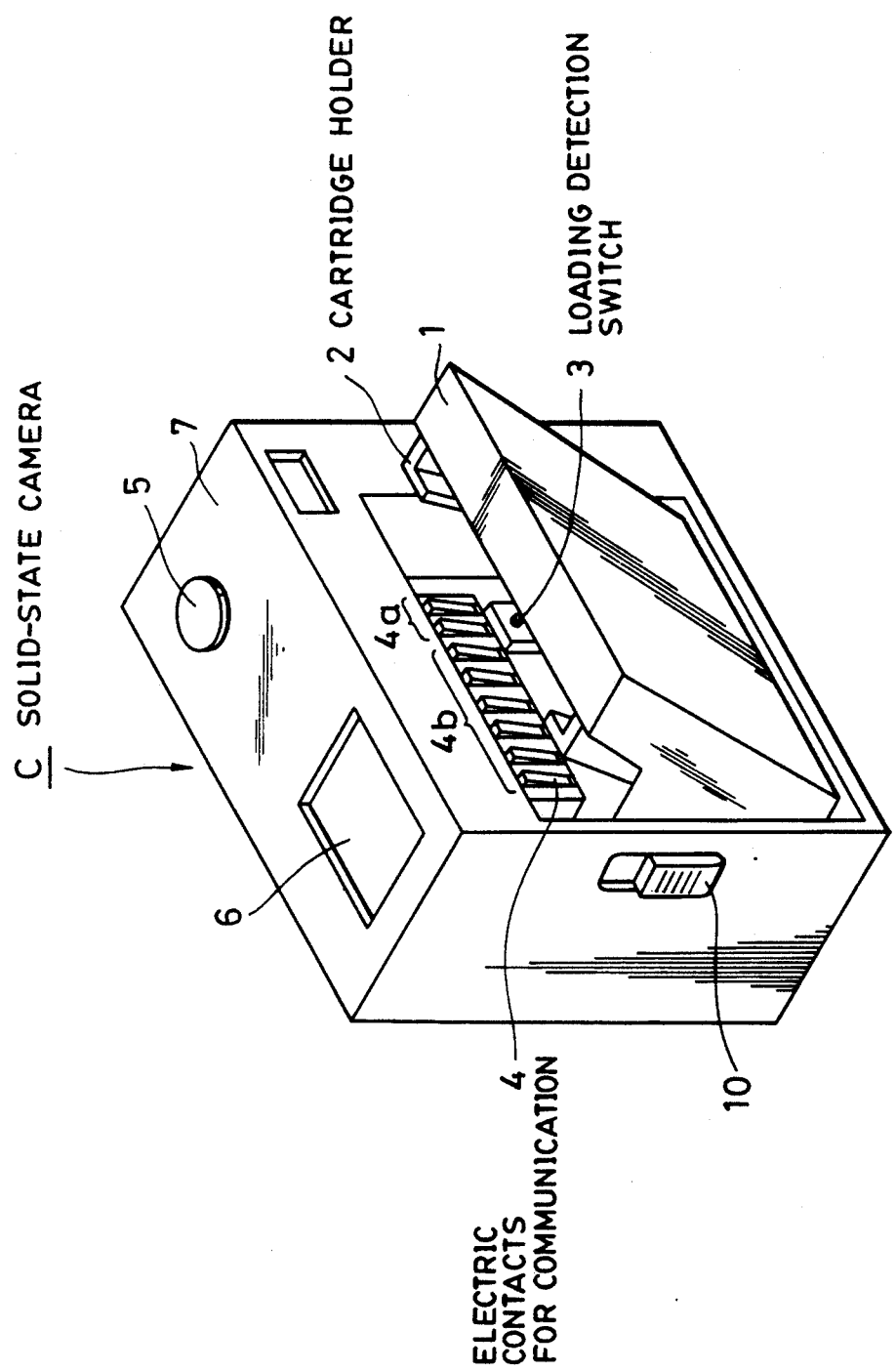

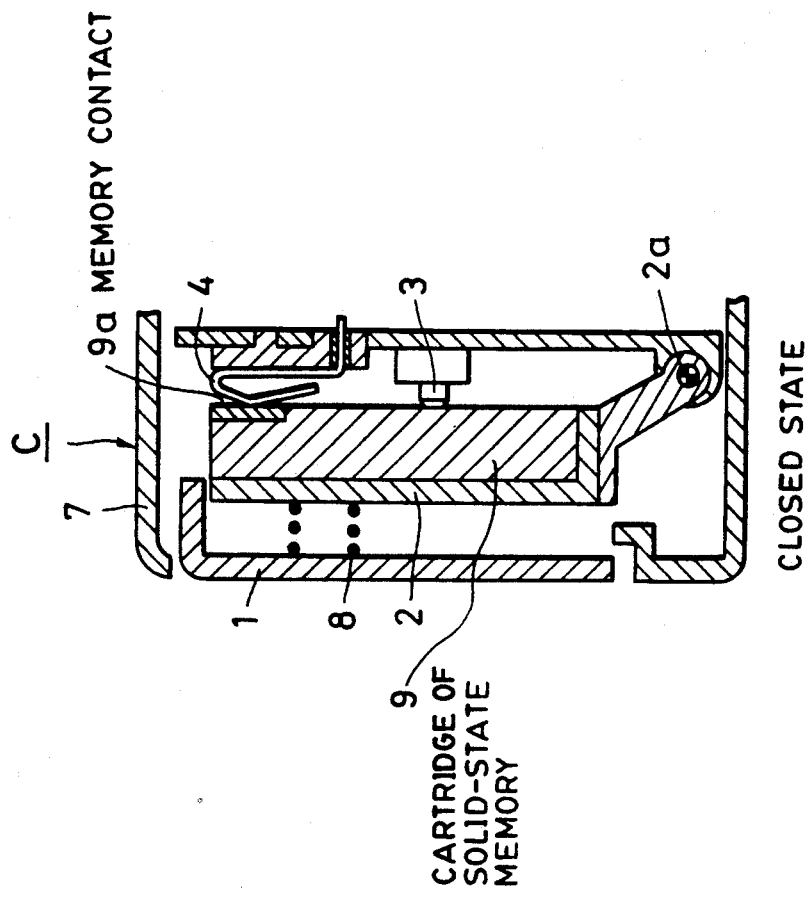
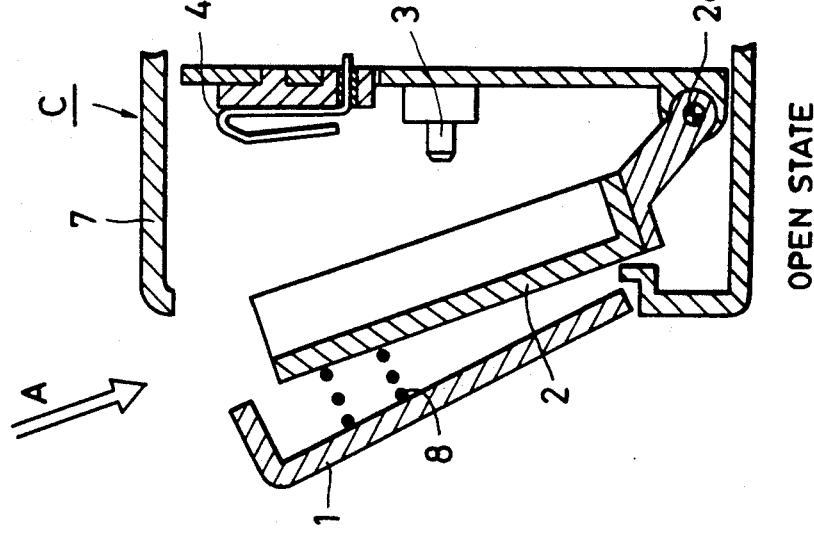

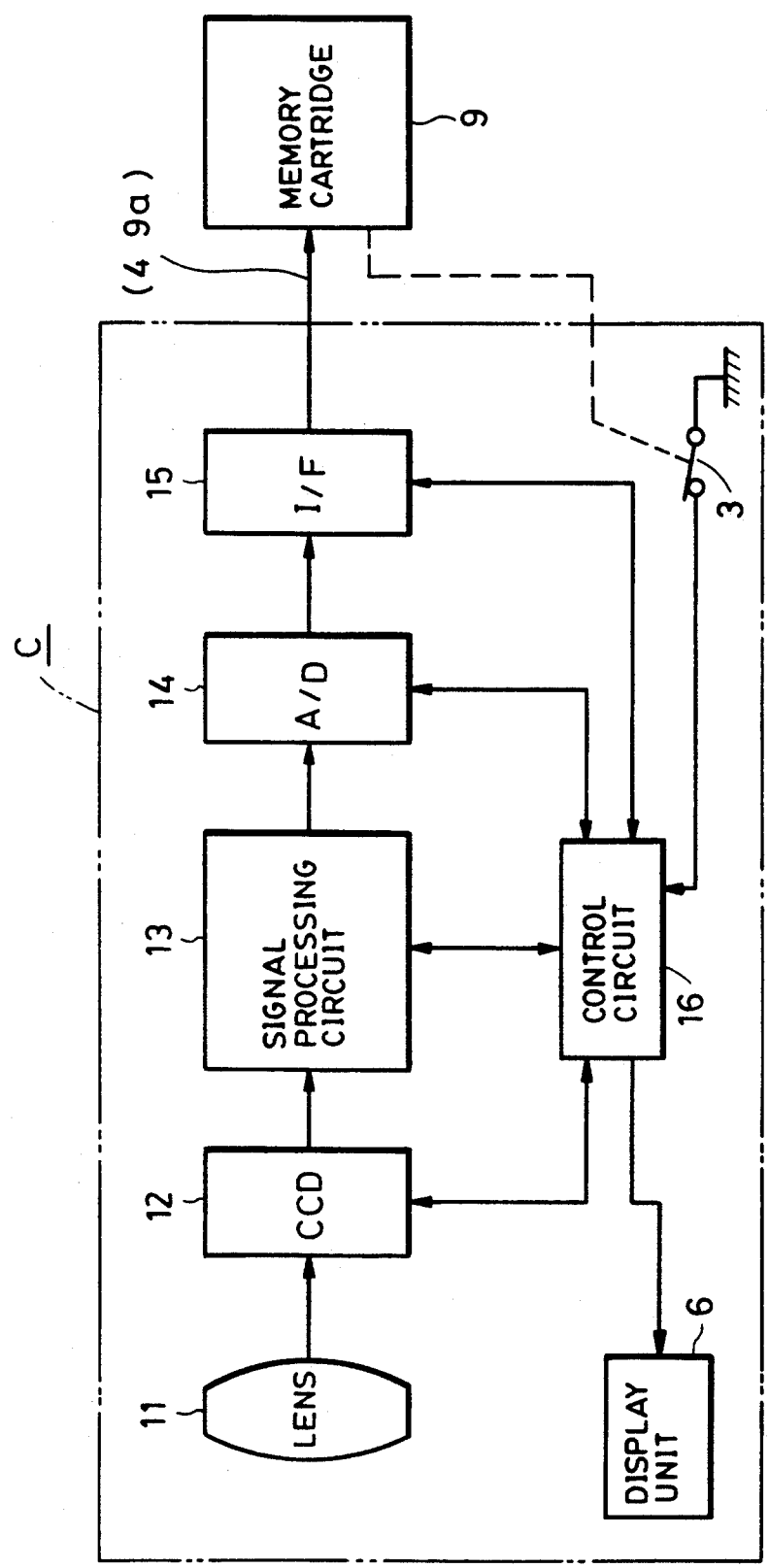

FIG. 6

| KIND OF MEMORY | MEMORY CAPACITY | CONTROL INFORMATION | BATTERY CAPACITY |
|---|---|---|---|

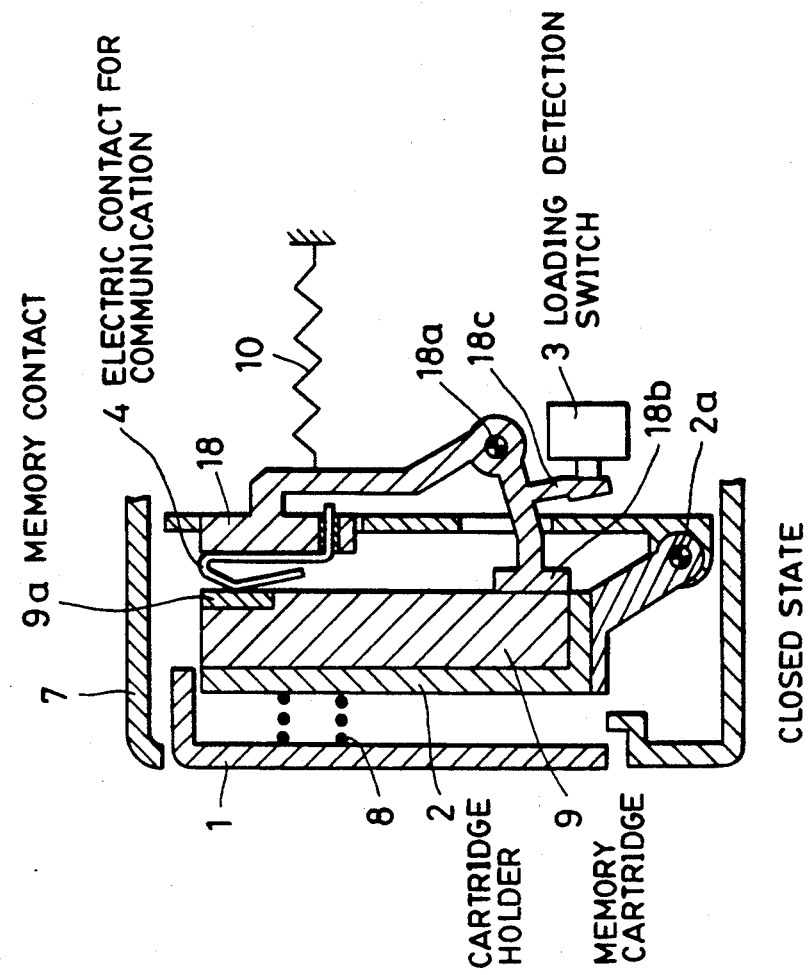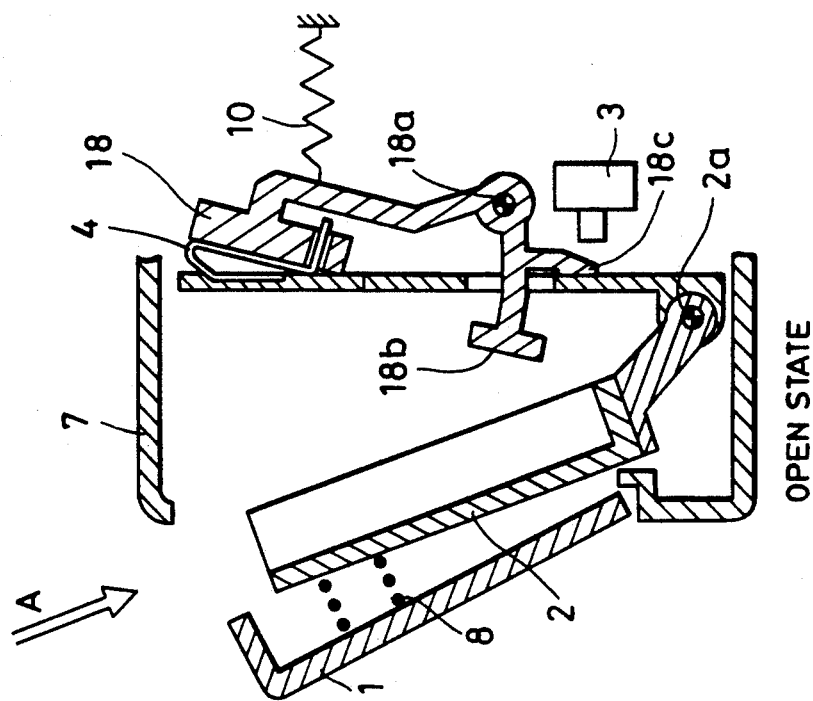

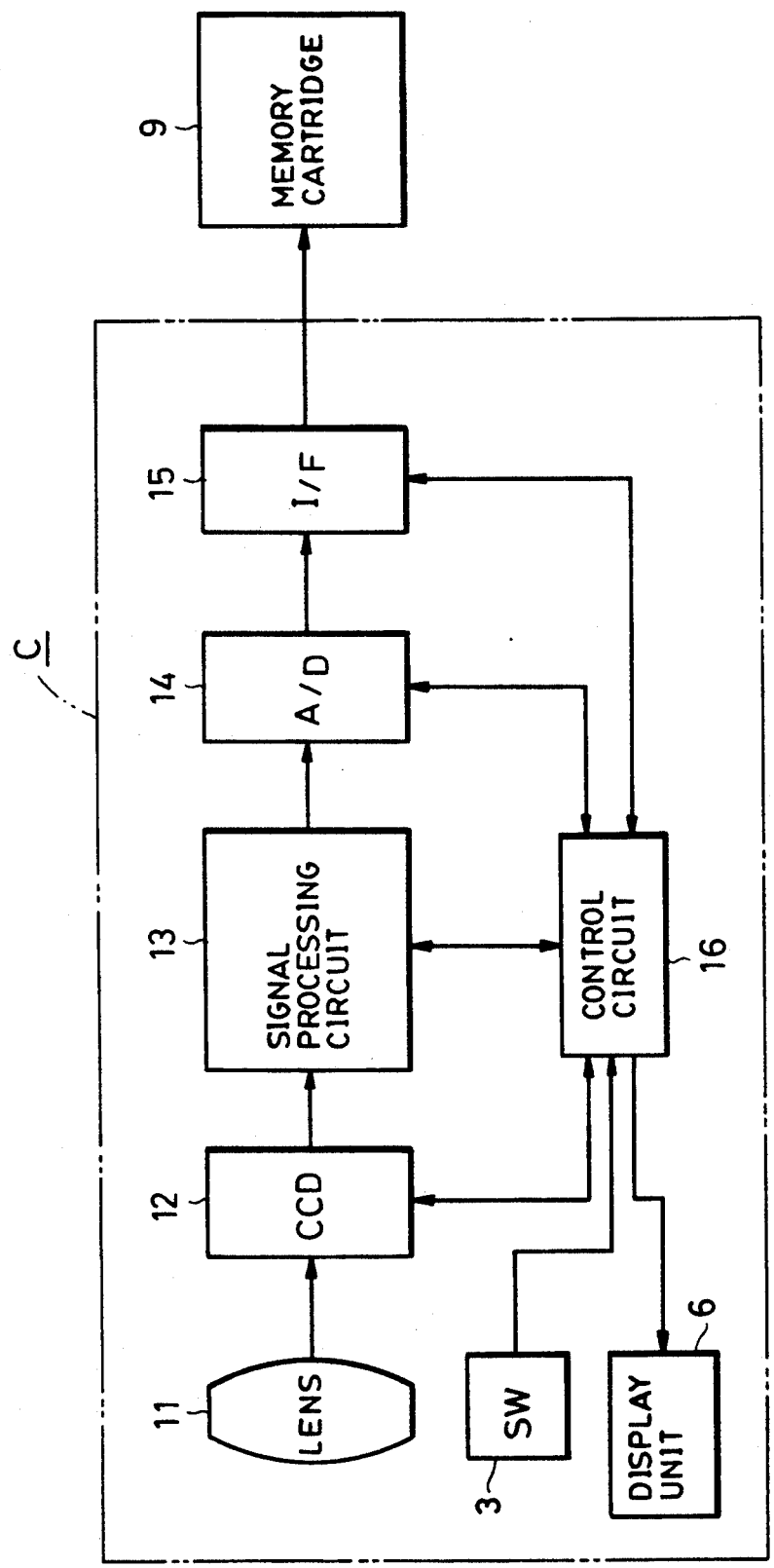

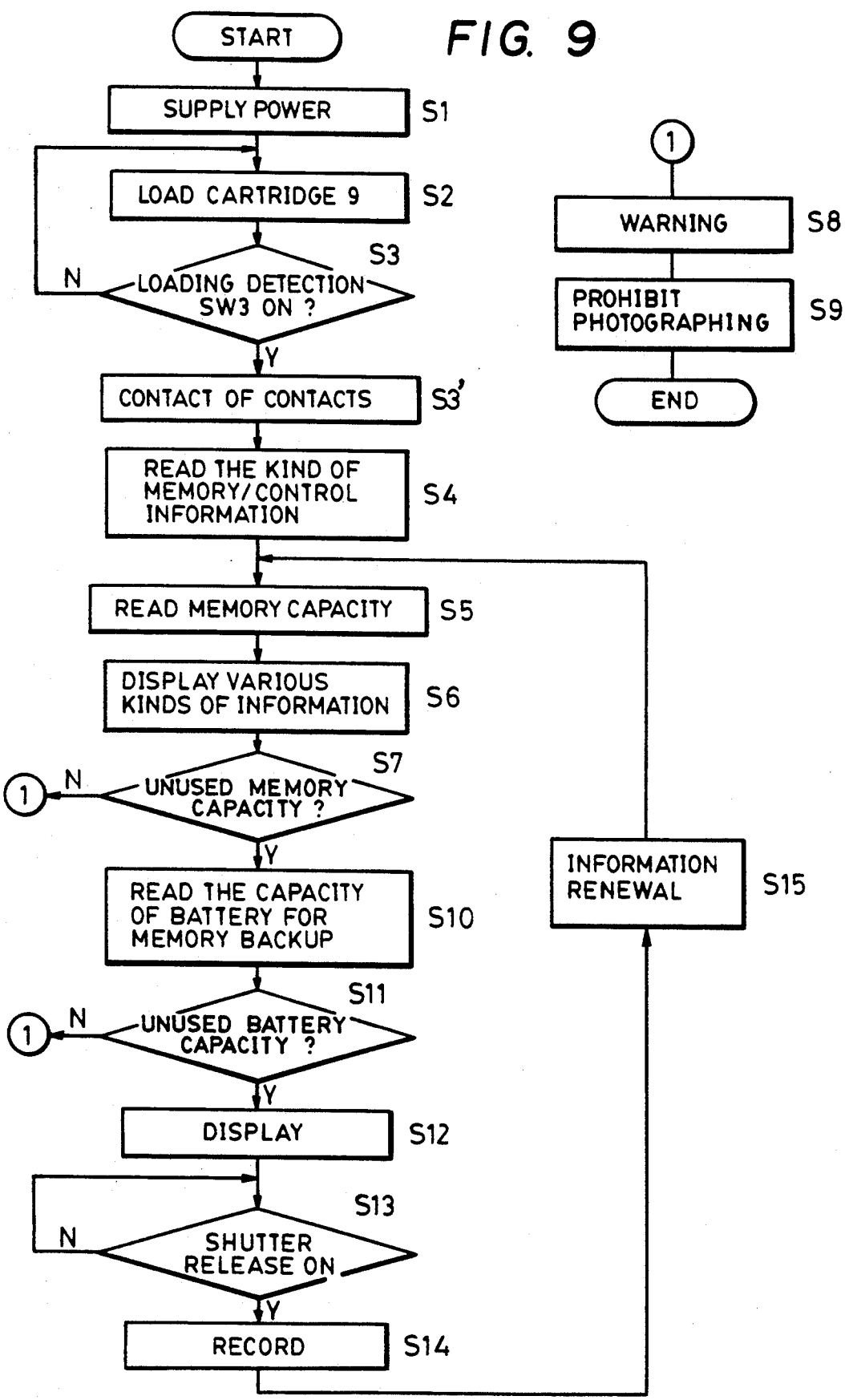

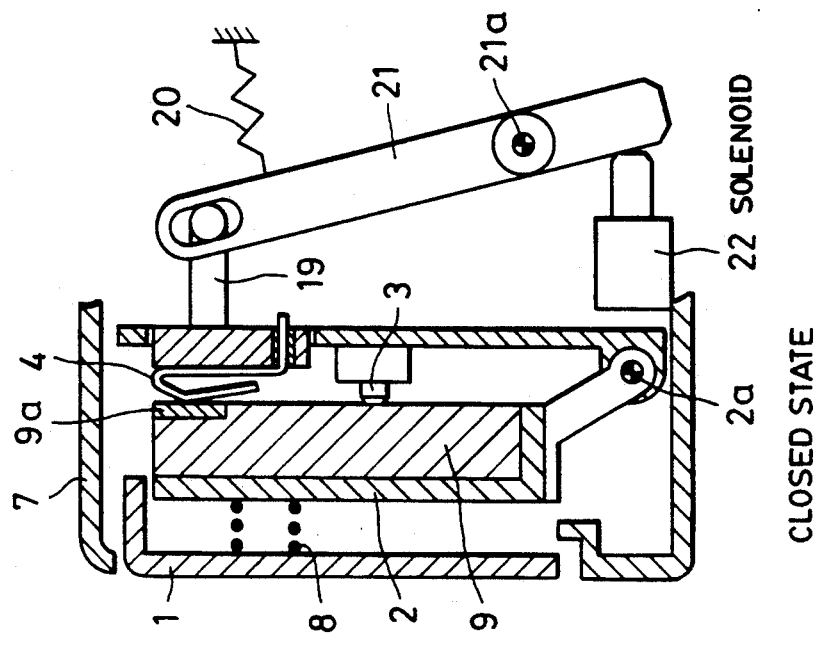
FIG. 10(a) OPEN STATE
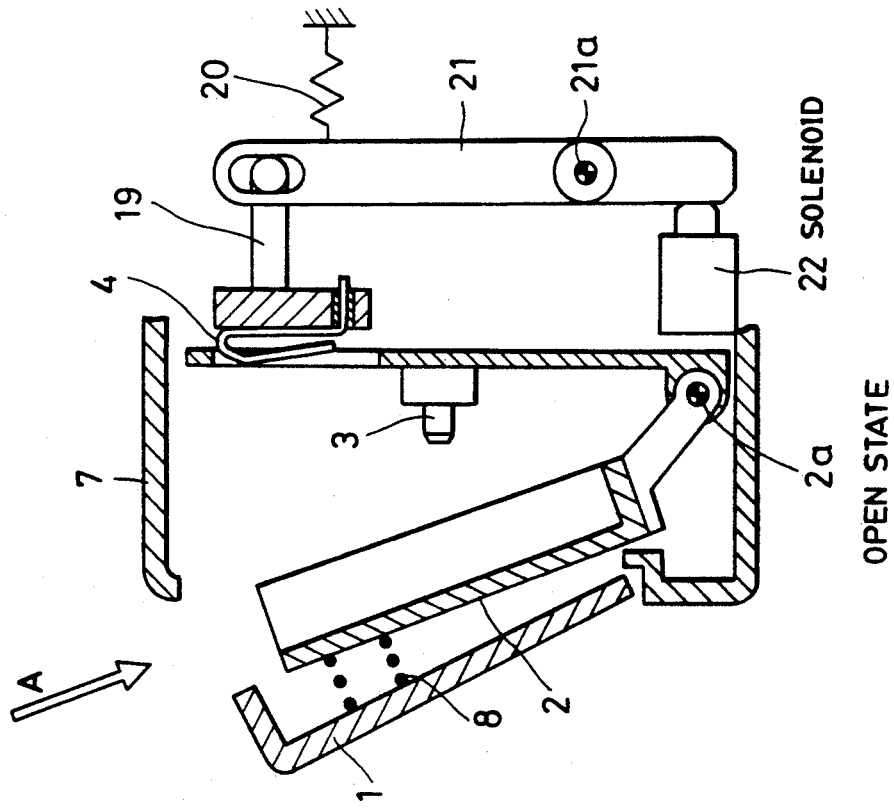
FIG. 10(b) CLOSED STATE

OPEN STATE

CLOSED STATE

CAMERA SENSING WHEN A MEMORY CARTRIDGE IS INSTALLED

This application is a continuation of application Ser. No. 07/404,520 filed Sep. 8, 1989, now abandoned.

BACKGROUND OF THE INVENTION

1. Field of the Invention

This invention is particularly suitable for use in an electronic camera, and the like, which uses a solid-state memory cartridge (a memory device which does not require relative movement between a medium and a recording/reproducing means for recording/reproducing information).

2. Description of the Prior Art

Recently, electronic still-picture cameras using memory devices which do not require moving mechanisms for recording/reproducing information (termed hereinafter solid-state cameras) are attracting notice as cameras which succeed those using silver chloride or silver halide films and video-floppy-type electronic still-picture cameras (termed hereinafter SV cameras).

In SV cameras, instantaneous reproducing of a pictured image is possible by electronically handling image information, and therefore image transmission, computer processing of an image, electronic storage of image information and the like become easy. In SV cameras of this kind, however, since considerable accuracy in processing is required for the mechanism in which the video floppy disk is rotated at high speed and picture information is recorded on the magnetic sheet with a track pitch of several tens to 100 $\mu$m, it is difficult to provide a low-cost camera. Although an optical-disk camera, which uses an optical recording medium instead of the floppy disk, has also been proposed, there is a limitation in providing a low-cost camera due to reasons similar to those described above.

Under such circumstances, the above-described solid-state cameras are expected to solve the disadvantages of second-generation cameras (SV cameras).

The concept of the system of a solid-state camera of this kind will now be explained.

FIGS. 1(a) and 1(b) show an example of a camera unit and a reproducer unit of a solid-state camera, respectively. In FIG. 1(a), there are shown a solid-state camera 31, and a memory cartridge 32 for storing image information. The memory cartridge 32 is constituted by an IC memory, a power supply for backup and the like. Photographing of an object becomes possible by inserting the memory cartridge 32 into a slot in the solid-state camera 31.

The memory cartridge 32 and the solid-state camera 31 may be connected to each other by various methods, such as by metal connectors, by a transmission coil, by optical couplers, and the like.

In FIG. 1(b), a reproducer 33 reproduces image information photographed by the solid-state camera 31 and the memory cartridge 32, and is constituted so that its output can be connected to a TV monitor, a video printer, a still-picture transmitter, a still-picture filing apparatus and the like.

In the conventional solid-state camera as described above, however, since information is communicated with the camera 31 by making the memory cartridge 32 an information medium, communication contacts between the memory cartridge 32 and the camera 31 must securely contact each other, and it is also necessary that there be no circuit failure within the memory cartridge 32 and that the capacity of a backup battery is sufficient. Photographing and recording are therefore performed after checking the above-described items immediately after a first shutter release, and confirming that communication is possible.

Accordingly, if there is a failure in communication between the camera 31 and the memory cartridge 32 as described above, recording can not be performed in spite of pressing a shutter release button.

In order to confirm in advance whether or not recording is possible with the inserted cartridge 32, or to receive information relative to the memory cartridge such as the capacity and the type of memory and the like, and to display on an LCD and the like on the camera 31 a confirmation of the photographing state, an external check switch may be provided on the camera. The above-described check and display may be performed in accordance with the operation of the check switch. For the user, however, it is most desirable that the camera 31 itself automatically performs the above-described check immediately after insertion of the cartridge 32 and provides a warning display, or displays the capacity and the type of the memory, the capacity of the backup battery and the like, for the purpose of preventing poor photographs. Furthermore, in a camera controlled according to information stored in memory, it becomes necessary to provide the timing for reading the memory information before photographing.

In addition, electric contacts 4 of the camera 31 can be easily contacted by hand and can be easily penetrated by dust, as can be understood from the appearance of the camera shown in FIG. 1(c). This is a big reason for failure in communication between the camera 31 and the memory cartridge 32. In FIG. 1(c), there are shown a back cover 1, a cartridge holder 2, electric contacts 4 (4a and 4b will be described later), a shutter release button 5, a display unit 6, such as an LCD and the like, and a case 7.

Furthermore, when the cartridge 32 directly contacts the electric contacts 4 of the camera by sliding within the cartridge holder 2, as in FIG. 1(a) or as in the cross-sectional view of an insertion-by-sliding type cartridge holder shown in FIG. 1(d), abrasion of the electric contacts 4 is remarkable. Such abrasion also causes a failure in communication, and the number of times the cartridge can be inserted into the camera is limited.

In FIG. 1(d), there is also shown a memory contact 32a at the side of the cartridge.

SUMMARY OF THE INVENTION

It is an object of the present invention to provide a solid-state camera which automatically performs a check of whether or not various conditions for photographing are fulfilled, and provides necessary display/warning and the like, when the solid-state memory cartridge is loaded in the camera.

It is a further object of the present invention to provide a camera which checks whether or not the camera is capable of photographing and gives a necessary warning, reads memory information from the camera, and displays the capacity and type of memory and the like, and in which control of the camera is automatically performed based on the memory information and the like, immediately after insertion of a solid-state memory cartridge into the camera, and which can confirm these states immediately after loading the cartridge into the camera.

These and other objects are accomplished, according to one aspect of the present invention, by a camera which comprises loading detection means for detecting the completion of the loading of a semiconductor memory cartridge in the camera, communication means for communicating data between the memory cartridge and the camera, and control means for starting data communication by the communication means when the loading detection means detects the completion of the loading of the memory cartridge.

It thereby becomes possible to check whether or not the camera is capable of photographing immediately after insertion of the memory cartridge, and if necessary, to give a warning, read memory information from the camera and display the capacity and type of memory and the like, and control the camera according to the information in the memory. Since it is possible to confirm whether or not photographing is possible immediately after insertion of the memory cartridge, it becomes possible to make quality photographing more certain.

It is a further object of the present invention to provide a solid-state camera which can prevent camera malfunction due to the user carelessly touching contacts of the camera or dust adhering to the contacts, and which can detect the photographing capability of the camera immediately after insertion of a solid-state memory cartridge into the camera.

It is still another object of the present invention to provide a camera which can prevent camera malfunction due to the user carelessly touching contacts of the camera or dust and the like penetrating and adhering to the contacts, and can also prevent abrasion of the contacts, and which begins communication between the cartridge and the camera in accordance with an output of the detection means immediately after insertion of the cartridge into the camera to confirm that the camera is capable of photographing, and can prevent malfunctions due to a failure in the contacts, a failure in circuitry within the cartridge, and the like.

These and other objects are accomplished, according to another aspect of the present invention, by a camera which comprises loading detection means for detecting the completion of the loading of a solid-state memory cartridge into the camera, connection means for providing a communication channel for data communication between the memory cartridge and the camera, and control means for controlling the connection means in response to the detection by the loading detection means to provide the commincation channel between the memory cartridge and the camera, and for starting data communication between the memory cartridge and the camera via the communication channel.

According to another aspect of the invention, a camera includes a movable connection electrode which moves from a first position having a distance from an electric contact of a semiconductor memory cartridge to a second position connectable to said electric contact by a loading operation of the semiconductor memory cartridge. A switch is provided for detecting the movement of the connection electrode to the second position, and a control circuit is included for starting data communication between the camera and the semiconductor memory cartridge when the switch detects that the connection electrode has moved to the second position. Since the movable connection electrode can be stored within the camera body, this configuration prevents the user touching the contacts, dust or dirt adhering to the contacts, or abrasions of the contacts by sliding the memory cartridge against the contacts.

These and other objects and features of the present invention will become more apparent from the following description taken in connection with the accompanying drawings.

BRIEF DESCRIPTION OF THE DRAWINGS

FIG. 2 is a perspective view of a first embodiment of the solid-state camera according to the present invention;

FIGS. 3(a) and 3(b) are cross-sectional views of an insertion unit of the memory cartridge shown in FIG. 2;

FIG. 4 is a block diagram of the camera of the first embodiment;

FIG. 6 is an example of the content of the communication data of the first embodiment;

FIGS. 7(a) and 7(b) are cross-sectional views of an insertion unit of a memory cartridge of a second embodiment of the present invention;

FIG. 8 is a block diagram of the camera of the second embodiment;

FIG. 9 is a sequence flow chart of the control operation of the second embodiment;

FIGS. 10(a) and 10(b) are cross-sectional views of a third embodiment of the present invention.

DESCRIPTION OF THE PREFERRED EMBODIMENTS

Figure 1A:
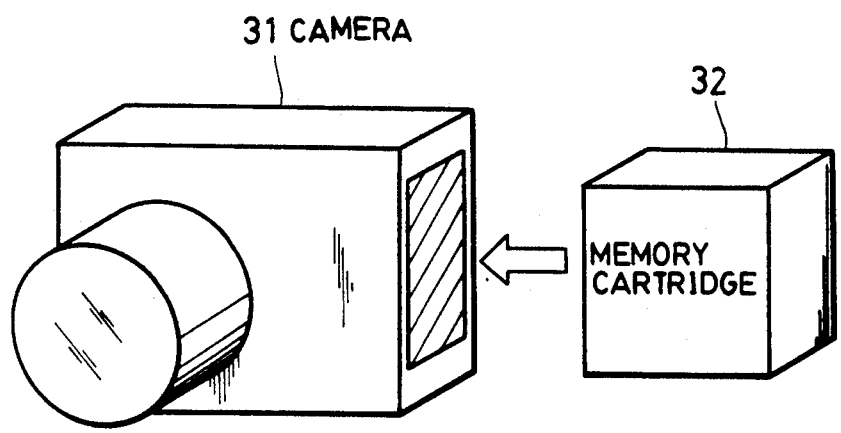
FIGS. 1(a) and 1(b) are diagrams of a camera unit and a reproducer unit of a conventional solid-state camera, respectively.
Figure 1B:
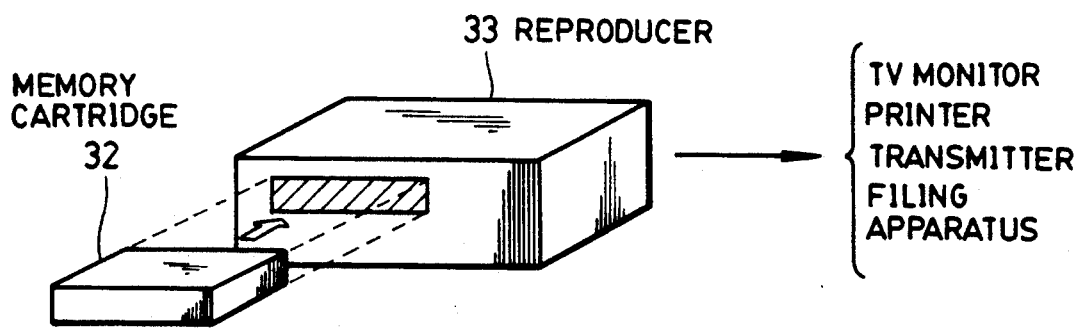

The present invention will now be explained according to the preferred embodiments.

FIG. 2 is a perspective view of a first embodiment of a solid-state camera according to the present invention. FIGS. 3(a) and 3(b) are cross-sectional views of an insertion unit of the solid-state-memory cartridge shown in FIG. 2. FIG. 3(a) shows a cartridge holder 2 opened, and FIG. 3(b) shows a memory cartridge 9 loaded and the cartridge holder 2 closed.

In FIGS. 2, 3(a), and 3(b), there are an outer cover 1, a cartridge holder 2 which is pivotably mounted around a fulcrum 2a and holds a memory cartridge, a loading detection switch 3 which is operated by the presence of a memory cartridge while closing the cartridge holder, electric contacts 4 (4a and 4b will be described later) for performing communication with a memory cartridge 9, and a shutter release button 5. FIGS. 2 and 3 also show a display unit 6, such as an LCD or the like, a case member 7, a compression coil spring 8 for biasing the cartridge holder toward the loading direction when closing the cartridge holder, a solid-state-memory cartridge 9, its electric contact 9a at the side of the memory cartridge, and a memory-cartridge ejection button 10 for releasing a well-known locking means (not illustrated) to open the outer cover and the cartridge holder and to eject the memory cartridge.

Next, the operation in the above-described configuration will be explained.

In photographing, the locking means (not illustrated) is released by the operation of the ejection button 10 to open the cartridge holder as shown in FIG. 3(a). The memory cartridge 9 is inserted into the cartridge holder 2 in the direction of the arrow A.

In the midst of insertion, if the memory cartridge 9 has a barrier shutter for protecting the electric contacts, the barrier shutter is, of course, opened by an opening means (not illustrated). The insertion position of the cartridge is then nearly fixed by a locking mechanism (not illustrated). Subsequently, by closing the outer cover 1, the electric contact 9a of the memory cartridge contacts the electric contact 4 of the camera, as shown in FIG. 3(b). The loading detection switch 3 is then actuated by the memory cartridge being loaded, and the outer cover 1 is kept locked by an outer-cover locking mechanism (not illustrated).

Upon reception of an operation signal from the loading detection switch 3, the camera C starts communication with the memory cartridge 9. The camera confirms whether or not the memory cartridge is in a recordable state, and reads information (such as the capacity and the type of the memory cartridge 9, control information and the like) to control the camera or display the information on the camera display unit 6. The camera also checks the capacity of a battery for backing up the cartridge 9, activates a warning display on the camera display unit 6 if necessary, or makes the camera operation impossible if there is an abnormality.

When it is determined that the camera is capable of photographing after the checking operation as described above, photographing and recording operations can be started by the operation of the shutter release switch 5.

FIG. 4 shows a block diagram of the camera of the first embodiment. In FIG. 4, there are shown a photographing lens 11, a solid-state imaging device 12, such as a CCD or the like, a signal processing circuit 13 for performing predetermined signal processing on the output signal from the imaging device, an A/D converter 14, a memory interface 15 between the camera and the memory cartridge, a control circuit 16 for controlling the operation of the entire camera including mode setting, a cartridge loading detection switch 3, a display unit 6, and a memory pack (a memory cartridge) 9. FIG. 4 illustrates that the cartridge loading detection switch 3 is activated by the memory cartridge 9.

Light passing through the photographing lens 11 is focused on an imaging surface of the CCD 12, and a signal from the CCD 12 is subjected to a predetermined processing by the signal processing circuit 13 and then converted into a digital signal by the A/D converter 14. The digital signal is then recorded in a predetermined storage area within the memory cartridge 9 via the memory interface 15.

Figure 5:
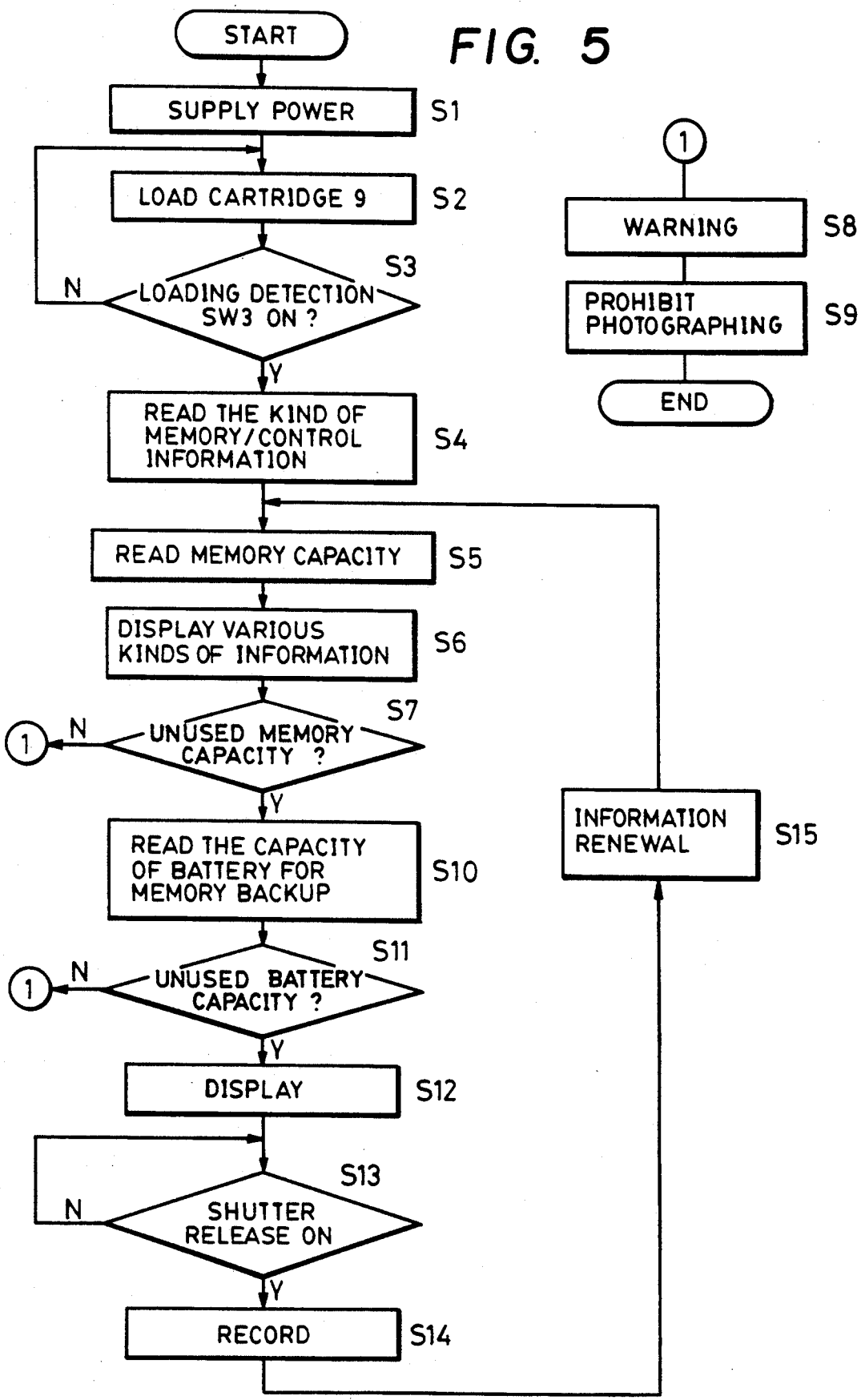
FIG. 5 is a flow chart of the control operation of the camera of the first embodiment.

FIG. 5 shows a flow chart of a control operation of the camera of the present embodiment. FIG. 6 is a diagram indicating the content of the communicated data. An explanation of the FIG. 4 embodiment will now be provided with reference to FIGS. 5 and 6.

In FIG. 5, after power from a power supply has been applied to the camera at step S1, the memory cartridge 9 is loaded into the body of the camera C at step S2. The loading detection switch 3 is then activated at step S3 as described above. After confirming receipt of the signal from the detection switch 3, the control circuit 16 of the camera C reads several kinds of information consisting of control information (such as the type and the capacity of the memory, the capacity of the battery, the date, the content of the recording and the like) stored in the memory, (steps S4 and S5), and displays the information on the display unit 6 (step S6). If there is no unused memory capacity at step S7, a warning (such as an indication of the impossibility of photographing and the like) is given to the display unit 6, and photographing by the camera is made impossible (steps S8 and S9). If there remains unused memory capacity for photographing at step S7, the capacity of the battery for backing up the memory is checked at step S10. If the remaining capacity is less than a predetermined value, the process jumps to steps S8 and S9, where a warning (such as an indication of the impossibility of photographing) is given on the camera display unit 6, and photographing) by the camera is made impossible. If the remaining capacity of the battery is not less than a predetermined value at step S10, the process proceeds to display photographing information at step S12, detect shutter release at step S13, and perform photographing and recording at step S14. At step S15, a renewal of information (such as the number of photographed frames, remaining memory capacity and the like) is performed, and the same operations from step S5 are performed thereafter.

Although, in the above-described embodiment, the electric contacts 4 and the loading detection switch 3 are separately disposed, loading detection switches (contacts) 4a may also be disposed in parallel with plural electric contacts 4b, as shown in FIG. 2. One of the contacts 4a is for grounding. After the completion of the loading of the cartridge, contacts 4a and 4b contact the cartridge contact 9a, and it is determined whether loading is "completed" or "not completed", by whether an output signal (current value or voltage value) from contact 4a is "high" or "low" with respect to a reference level.

Furthermore, for the purpose of decreasing the number of contacts and increasing reliability, it is also possible to use the above-described contacts 4a and 4b in common, and perform communication by transmitting the content of the signals (loading detection and data communication) in series.

As explained above, according to the present invention, detection means are provided for detecting the completion of the loading of a solid-state-memory cartridge, and communication control means are provided for starting data communication between the memory cartridge and the camera in accordance with an output of the detection means. It thereby becomes possible to check whether or not the camera is under a state capable of photographing immediately after insertion of the memory cartridge, and if necessary, to give a warning, read memory information into the camera, display the capacity and the type of memory and the like, and control the camera according to the memory information. Since it is possible to confirm whether or not photographing is possible immediately after insertion of the memory cartridge, it becomes possible to perform photographing more reliably.

A second embodiment of the present invention will now be explained.

FIGS. 7(a) and 7(b) show cross-sectional views of an insertion unit of a solid-state memory cartridge of the second embodiment of the present invention. FIG. 7(a) shows a memory cartridge holder 2 opened, and FIG. 7(b) shows a memory cartridge 9 loaded and the cartridge holder 2 closed. Components which are identical to those shown in FIG. 1 and in FIG. 2 are indicated by identical numerals.

In FIGS. 7(a) and 7(b), there are shown an outer cover 1, a cartridge holder 2 pivotable around a fulcrum 2a, a contact lever 18 pivotably mounted around a fulcrum 18a and rotated by the loading of the memory cartridge, an electric contact 4 which contacts an electric contact of the memory cartridge to perform communication of data, a case 7, a compression coil spring 8 for biasing the cartridge holder 2, a solid-state memory cartridge 9, its electric contact 9a, a memory-cartridge loading detection switch 3a, and a tension coil spring 10 for biasing the contact lever 18. On the contact lever 18, the electric contact 4 is mounted at one end facing the electric contact 9a, and at another end, there is formed a memory-cartridge detection unit 18b which is pressed by the memory cartridge 9 when the cartridge holder 2 housing the memory cartridge is closed. Lever 18 also includes an operation piece 18c for operating the loading detection switch 3.

Now, the operation of the second embodiment will be explained.

In photographing, the cover 1 is opened by the operation of an ejection button (not illustrated), and the memory cartridge 9 is inserted into the cartridge holder 2 in the direction of the arrow A.

At this time, since the contact lever 18 is rotated in the clockwise direction by the coil spring 10 and the electric contact 4 is within the body of the camera, the user cannot touch the contact, and dust cannot penetrate and adhere to the contact.

When the cartridge holder 2 is rotated around the fulcrum 2a pressing the outer cover 1 closed, the memory cartridge 9 presses the cartridge detection unit 18b to rotate the contact lever 18 around the fulcrum 2a in the counterclockwise direction against the coil spring 10. When the cartridge holder 2 is closed, the electric contact 4 contacts the memory contact 9a, and the loading detection switch 3 is simultaneously operated by the operation piece 18c. Subsequently, the camera starts communication with the memory cartridge 9, and confirms whether or not the memory cartridge is in a recordable state, reads information (such as the capacity and the type of the memory cartridge 9, control information and the like) to thereby control the camera or display the information on the camera display unit 6. The camera also checks the capacity of a battery for backing up the cartridge 9 to provide a warning display on the camera display unit 6, or makes a photographing operation impossible if there is an abnormality.

When the camera determines that it is capable of photographing after the checking operation described above, photographing and recording operations are started by the operation of the shutter release switch 5.

FIG. 8 shows a block diagram of the second embodiment. Since the configuration is similar to that of the first embodiment shown in FIG. 4, like components are indicated by like numerals. In FIG. 8, a solid-state camera C includes a photographing lens 11, a solid-state imaging device 12, a signal processing circuit 13, an A/D converter 14, a memory interface 15, a control circuit 16, a cartridge loading detection switch 3, and a display unit 6. There is also shown a memory pack (a memory cartridge) 9.

Light passing through the photographing lens 11 is focused on the CCD 12, a signal from the CCD 12 is subjected to processing by the signal processing circuit 13 and then converted into a digital signal by the A/D converter 14. The digital signal is then recorded in the memory cartridge 9 via the memory interface 15.

FIG. 9 shows a flow chart of a control operation of the second embodiment. The content of communication data is as shown in FIG. 6. An explanation will be hereinafter provided according to FIGS. 9 and 8.

In FIG. 9, steps identical to those of in FIG. 5 are identified by like numerals. After power from a power supply has been applied at step S1, the memory cartridge 9 is loaded into the body of the camera C at step S2. The loading detection switch 3 is then operated at step S3 as described above. After the camera C has confirmed the signal from the detection switch 3, the contact 4 contacts the cartridge contact 9a at step S3' to read several kinds of information stored in the memory, as shown in FIG. 6 (steps S4 and S5), and the display 6 displays the information (step S6). If there is no unused memory capacity at step S7, a warning (such as indicating the impossibility of photographing and the like) is given to the display unit 6, and photographing is made impossible (steps S8 and S9). If there remains unused memory capacity for photographing at step S7, the remaining capacity of the battery for backing up the memory is checked at step S10. If the remaining capacity is less than a predetermined value, the process jumps to steps S8 and S9, where the warning and photograph prohibition operations are carried out, as described above.

If the remaining capacity of the battery for backup is not less than a predetermined value at step S10, the process proceeds via a display at step S12 to step S13, and photographing and recording are performed at step S14 by a release signal detected at step S13. At step S15, renewal of information, such as the number of photographed frames, remaining memory capacity and the like, is performed, and the same operations are performed from step S5.

FIGS. 10(a) and 10(b) show diagrams corresponding to a third embodiment of the present invention. FIGS. 10(a) and 10(b) are cross-sectional views of the cartridge holder 2 opened, and the cartridge holder 2 (loaded with the memory cartridge 9) closed, respectively. In FIGS. 10(a) and 10(b), components identical to those in FIG. 7 are indicated by identical numerals.

In FIGS. 10(a) and 10(b), there are shown an outer cover 1, a cartridge holder 2 pivotable around a fulcrum 2a, a cartridge-loading detection switch 3, an electric contact 4 for communication, a case 7, a compression coil spring 8 for biasing the cartridge holder, a memory cartridge 9, a contact 9a of its memory, a contact holder 20, a contact lever 21 pivotable around a fulcrum 21a, a solenoid 22, and a tension coil spring for biasing the lever 21.

Now, the operation of the third embodiment will be explained. As in the second embodiment shown in FIG. 7, the camera is operated by the operation of an ejection switch (not illustrated), and the memory cartridge 9 is inserted into the cartridge holder 2.

At this time, since the electric contact 4 is within the body of the camera, the user cannot touch the contact, and dust cannot penetrate and adhere to the contact. The cartridge holder 2 is then rotated around the fulcrum 2a by pressing the outer cover 1, and the loading detection switch 3 is activated by the memory cartridge 9 as shown in FIG. 10(b). The solenoid 22 is operated by a signal from the loading detection switch 3 to rotate the contact lever 21 around the fulcrum 21a in the counterclockwise direction. As a result, the contact holder 20 supporting the electric contact 4 is moved to the left by a predetermined amount to contact the contact 9a of the memory cartridge.

Photographing and recording are performed thereafter like in the second embodiment described above.

Figure 1C:
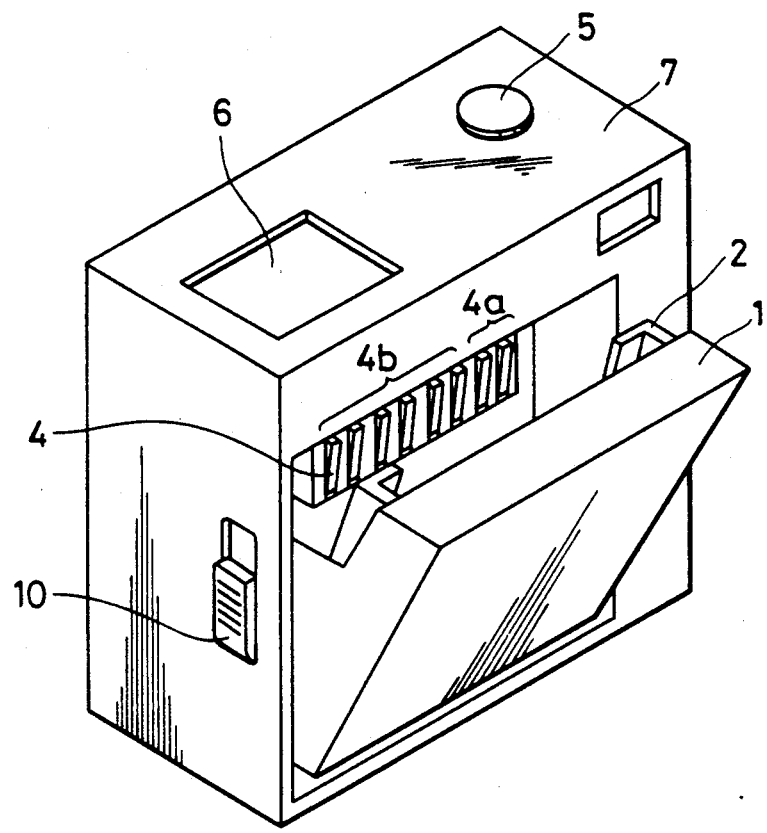
FIG. 1(c) is a perspective view showing a loading unit for a memory cartridge of a conventional solid-state camera.
Figure 1D:
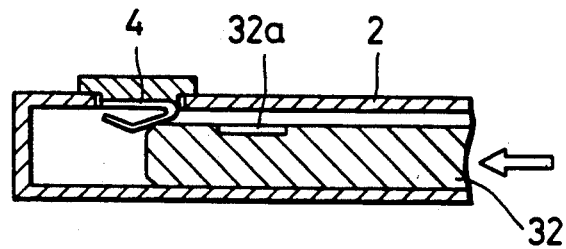
FIG. 1(d) is a cross-sectional view showing a memory-cartridge holder.
Figure 11A:
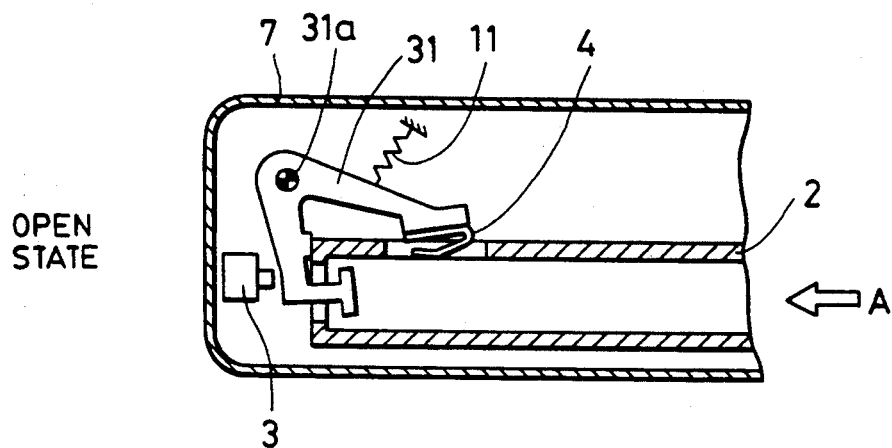
FIGS. 11(a) and 11(b) are cross-sectional views of a fourth embodiment of the present invention.
Figure 11B:
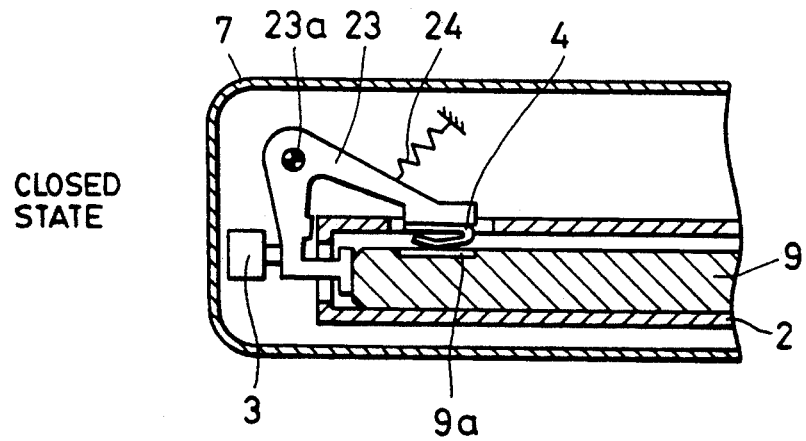

FIGS. 11(a) and 11(b) are cross-sectional views showing a fourth embodiment wherein the cartridge is installed by sliding it into the camera, and generally corresponds to FIG. 1(d) of the above-described conventional example. FIG. 11(a) is a cross-sectional view of the cartridge holder 2 before insertion of the memory cartridge 9, and FIG. 11(b) is a cross-sectional view after insertion of the memory cartridge 9. In FIGS. 11(a) and 11(b), components identical to those in FIG. 3/FIG. 7 of the above-described first/second embodiment are indicated by identical numerals.

That is, in FIG. 11, there are shown a memory cartridge 9, a memory contact 9a, a cartridge holder 2, an electric contact 4, a contact lever 31, a tension coil spring 11 for biasing the lever, a loading detection switch 3, and a case 7.

The memory cartridge 9 is inserted into the holder 2 in the direction of the arrow A shown in FIG. 11(a), and the contact lever 23 is rotated around the fulcrum 23a in the clockwise direction. As a result, the electric contact 4 contacts the memory contact 9a as shown in FIG. 11(b). At that time, the loading detection switch 3 is operated. Subsequently, photographing and recording are performed as in the first and second embodiments described above. In the fourth embodiment, since the electric contact 4 contacts 9a near the completion of the insertion of the cartridge 9, it is possible to reduce abrasion of the contact 4.

Although, in the above-described second through fourth embodiments, the electric contacts 4 and the loading detection switch 3 are separately disposed, loading detection switches 4a may also be disposed in parallel with plural electric contacts 4b, as shown in FIG. 1(c). One of the contacts 4a is for grounding. After the completion of the loading of the cartridge, plural contacts 4a and 4b contact the cartridge contact 9a, and it is determined whether loading is "completed" or "not completed" by whether a signal (current value or voltage value) output by the contact 4a is "high" or "low" with respect to a predetermined level.

Furthermore, for the purpose of decreasing the number or contacts and increasing reliability, it is also possible to use the above-described contacts 4a and 4b in common, and perform communication by transmitting the content of the signals (loading detection and data communication) in series.

As explained above, according to the present invention, contact means are provided for contacting an electric contact in response to an output of a loading detection means for detecting the completion of the loading of a solid-state memory cartridge, and communication control means are provided for starting data communication between the memory cartridge and the camera in accordance with an output of the loading detection means. It thereby becomes possible to prevent the user from touching the contacts of the camera and to prevent dust and the like from penetrating and adhering to the contacts.

The specific structural details of the devices represented by blocks in the schematic diagrams in the drawings are per se well known or could be readily constructed by the person of ordinary skill in this field without undue experimentation. Therefore, the exact structure of the blocks in the schematic is not described in further detail in order to more clearly describe the present invention, and since such details are not critical to the best mode of carrying out the present invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Camera apparatus comprising:

loading detection means for detecting completion of loading of a semiconductor memory cartridge in the camera, the memory cartridge being detachable from said camera;

communication means for communicating data between the memory cartridge and said camera, said communication means having a plurality of electrodes which contact a corresponding plurality of electrodes of the memory cartridge in response to the loading of the memory cartridge in said camera;

electrode moving means for moving said electrodes of said communication means from a position apart from a loading path of said memory cartridge to a position at which said electrodes of the communication means contact the electrodes of the memory cartridge in response to loading of the memory cartridge;

control means, provided in said camera, for starting data communication between said camera and the memory cartridge by said communication means when said loading detection means detects the completion of the loading of the memory cartridge; and display means for displaying information provided from the memory cartridge immediately after the cartridge is detected as being inserted by said loading detection means, said display means being integral with said camera and being controlled by said control means.

2. Apparatus according to claim 1, further comprising:

(d) imaging means for receiving image information and converting it into an electric signal; and (e) signal processing means for converting the electrical signal of said imaging means into a form storable within the semiconductor memory cartridge.

3. Apparatus according to claim 2, further comprising a cartridge-housing unit coupled to said camera, for holding the memory cartridge, and wherein said loading detection means comprises a switch disposed within said cartridge-housing unit.

4. Apparatus according to claim 1, wherein said communication means comprises plural electric contacts connected to one another by the loading of the memory cartridge.

5. A camera comprising:

loading detection means for detecting completion of loading of a removable solid-state memory cartridge into the camera;

connection means for providing a communication channel for data between the memory cartridge and the camera, said communication means having a plurality of electrodes which contact a corresponding plurality of electrodes of the memory cartridge responsive to the loading of the memory cartridge in said camera;

electrode moving means for moving said electrodes of said connection means from a position apart from a loading path of said memory cartridge to a position at which said electrodes of said connection means contact the electrodes of the memory cartridge in response to loading of the memory cartridge;

control means, integral with said camera, for controlling said connection means in response to the detection by said loading detection means to provide said communication channel between the memory cartridge and said camera, and for starting data communication between the memory cartridge and said camera via said communication channel; and display means for displaying information provided from the memory cartridge immediately after the cartridge is detected as being inserted by said loading detection means, said display means being integral with said camera and being controlled by said control means.

6. A camera according to claim 5, wherein said solid-state memory cartridge comprises a semiconductor memory which can store a plurality of image information.

7. A camera according to claim 6, further comprising:
(d) imaging means for receiving image information and converting it into an electric signal; and
(e) signal processing means for converting an output signal of said imaging means into a form storable within the semiconductor memory cartridge.

8. A camera according to claim 5, wherein said loading detection means includes an operation member which moves in accordance with the loading operation of the memory cartridge, and moves said connection means toward the electrode of the memory cartridge when the cartridge is loaded.

9. A camera according to claim 8, wherein said loading detection means includes a switch which is turned on and off by the operation of said operation member.

10. A camera according to claim 9, wherein said control means starts data communication between said camera and said memory cartridge via said communication channel when said switch is turned on.

11. A camera comprising:
(a) a movable connection electrode which moves from a first position apart from a path of a removably mounted semiconductor memory cartridge to a second position connectable to the electric contact of the removably mounted memory cartridge by a loading operation of the semiconductor memory cartridge;
(b) a switch for detecting the movement of said connection electrode to said second position; and
(c) a control circuit, integral with said camera, for starting data communication between said camera and the semiconductor memory cartridge when said switch detects that the connection electrode has moved to the second position; and
(d) display means for displaying information provided from the memory cartridge immediately after the cartridge is inserted, said display means being integral with said camera and being controlled by said control circuit.

* * * * *

UNITED STATES PATENT AND TRADEMARK OFFICE
CERTIFICATE OF CORRECTION

PATENT NO. : 5,159,458                         Page 1 of 2
DATED    : October 27, 1992
INVENTOR(S) : MURATA, ET AL.

It is certified that error appears in the above-identified patent and that said Letters Patent is hereby corrected as shown below:

On the title page:
IN THE ABSTRACT [56]

Line USPD, Shibalke" should read --Shibaike--.
Line FPD, "247883 9/1981 France" should read --2478883 9/1981 France--.

COLUMN 10

Line 51, "(d)" should be deleted.
Line 53, "(e)" should be deleted.

COLUMN 11

Line 36, "(d)" should be deleted.

COLUMN 12

Line 1, "(e)" should be deleted.
Line 18, "(a)" should be deleted.
Line 25, "(b)" should be deleted.
Line 27, "(c)" should be deleted.

UNITED STATES PATENT AND TRADEMARK OFFICE
CERTIFICATE OF CORRECTION

PATENT NO. : 5,159,458
DATED : October 27, 1992
INVENTOR(S) : MURATA, ET AL

It is certified that error appears in the above-indentified patent and that said Letters Patent is hereby corrected as shown below:

Column 12, line 32, "(d)" should be deleted.

Signed and Sealed this

Twenty-third Day of November, 1993

Attest:

BRUCE LEHMAN

*Attesting Officer*   *Commissioner of Patents and Trademarks*